2,463,451

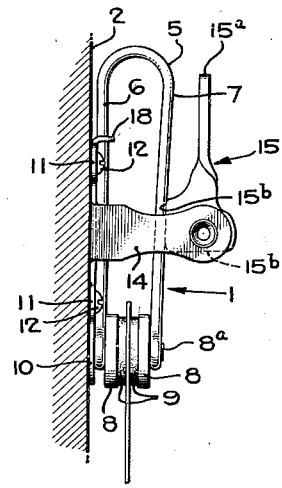
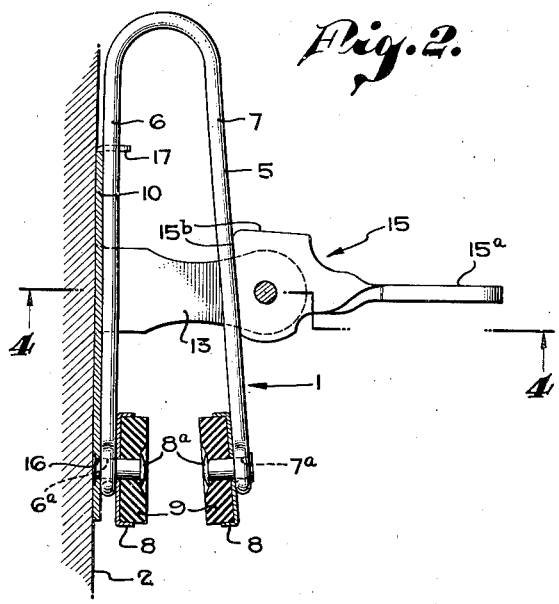
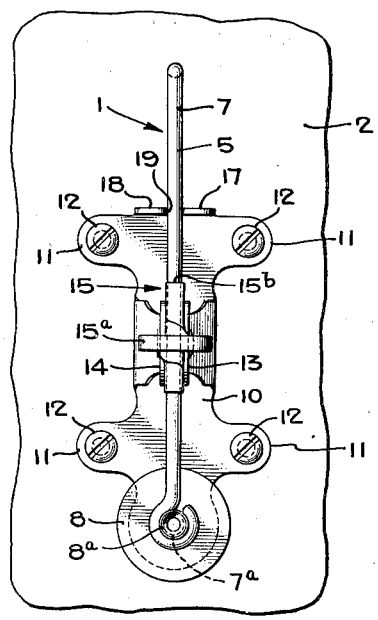
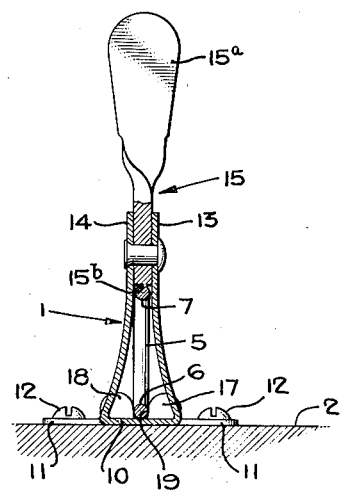
INVENTOR.
George Yates
BY Paul A. Weilcin
ATTORNEY Patented Mar. 1, 1949

UNITED STATES PATENT OFFICE 2,463,451

SUPPORTING CLAMP

George Yates, Glendale, Calif.

Application August 11, 1947, Serial No. 767,936

6 Claims. (Cl. 24—258)

This invention relates to a spring clamp for light materials; more particularly it relates to such a clamp arranged to be supported, as by mounting on a wall surface or the like.

It is an object of this invention to provide an improved clamp of this character.

It is another object of this invention to provide such a clamp having a novel form of mounting base.

It is another object of this invention to provide such a clamp wherein the resilience of the clamping members is utilized in a novel manner to assist in maintaining the base and the clamp in assembled relation.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense since the scope of the invention is best defined by the appended claims.

In the drawings:

Figure 1 is a side elevation showing the clamp of the invention in use;

Figure 2 is a longitudinal section on an enlarged scale, showing a different operating position of the parts;

Figure 3 is an elevation as seen from the right of Figure 2; and

Figure 4 is a section taken substantially as indicated by the line 4—4 of Figure 2.

Referring to the drawing, a clamp embodying the features of the invention is indicated generally by the numeral 1, and is shown as mounted on means providing a wall surface 2.

The clamp 1 comprises a U-shaped member 5 of resilient material, having legs 6 and 7 provided respectively with means, such as loops, forming apertures 6—a and 7—a at their free ends. Shallow cups 8, each carrying a resilient pad 9 of rubber or the like, which cooperate to form the gripping surfaces of the clamp, are secured to the legs 6 and 7. For this purpose, a rivet 8—a adapted to enter the aperture 6—a or 7—a is provided on each cup 8, and is riveted over after insertion. This rivet 8—a extends through the cup 8 as well as the pad 9.

The base 10 for mounting the clamp 1 comprises a plate extending along one of the legs, as for example the leg marked 6, and has oppositely directed apertured ears 11 extending laterally with respect to the member 5. These ears 11 are adapted to receive the screws 12 which secure the clamp 1 to the member 2.

The base 10 has a pair of integral spaced walls 13 and 14 which extend on opposite sides of the member 5 beyond the other leg 7 of the member 5, and pivotally support the operating member 15. This member 15 has a finger grip 15—a and a cam surface 15—b which is resiliently engaged by the leg 7. The cam surface 15—b is so arranged that with the finger grip 15—a substantially perpendicular to the legs 6 and 7, the legs are allowed to move to cause separation of the gripping surfaces formed by the pads, to permit insertion and removal of the article to be supported by the clamp 1.

With the finger grip 15—a substantially parallel with the legs 6 and 7, the high portion of the cam surface 15—b engages the leg 7, urging the pads 9 to gripping position. The operating member 15 is rendered self-locking in either of the above positions by appropriate design of the cam surface 15—b.

The base 10 and the member 5 are secured in assembled relation in a simple manner. Thus an aperture 16 is provided adjacent one end of the base 10 through which the rivet 8—a which secures the cup 8 on the leg 6, extends. Thus this shank when riveted over serves to secure the base 10 as well as the cup 8 to the leg 6.

To prevent angular movement of the base 10 about the rivet 8—a, a pair of spaced upstanding lugs 17 and 18 are provided adjacent that end of the base 10 opposite aperture 16. These lugs 17 and 18 cooperate to define a notch 19 for accommodating the leg 6, and respectively engage the opposite sides of the leg.

The base 10 has sufficient stiffness to maintain the notch 19 in engagement with the leg 6. However, it will be apparent that the resilience of the member 5 urging legs 6 and 7 apart, by acting through the operating member 15 and the side walls 13 and 14, exerts a force urging the notch 19 into engagement with the leg 6.

I claim:

1. A clamp comprising a resilient U-shaped member having opposed gripping surfaces respectively at the free ends of the legs, a base for mounting said member secured to one of said legs, having oppositely directed lateral extensions as well as a pair of spaced walls extending on opposite sides of said member beyond the other leg, and an operating member pivotally supported between said walls and having a cam surface continually engaging said other leg for causing movement of said gripping surfaces toward and away from each other in response to movement of the operating member about its pivot.

2. A clamp comprising a resilient U-shaped member having opposed gripping surfaces respectively at the free ends of the legs, means forming a base extending along one leg and having oppositely directed lateral extensions as well as a pair of spaced walls extending respectively on opposite sides of said member beyond the other leg, an operating member pivotally supported by said walls and engaging the other leg for causing movement of said surfaces toward and away from each other, means securing said base to said one leg, adjacent one end thereof, and means adjacent the opposite end for restraining lateral movement only between the base and said member.

3. A clamp comprising a resilient U-shaped member having opposed gripping surfaces respectively at the free ends of the legs, means forming a base extending along one leg and having oppositely directed lateral extensions as well as a pair of spaced walls extending respectively on opposite sides of said member beyond the other leg, an operating member pivotally supported by said walls and engaging the other leg for causing movement of said surfaces toward and away from each other, and means securing said base to said one leg, comprising rivet forming means extending through said base adjacent one end thereof, and means on said base adjacent the opposite end engaging the opposite sides of said leg to prevent angular movement of the base about said rivet forming means.

4. A clamp comprising a U-shaped resilient member, jaw means providing gripping surfaces on the free ends of said legs respectively, fastening means securing at least one of said jaw means to the respective leg, a base extending along said one leg and adapted to cooperate with said fastening means whereby one end of the base is secured to said leg, said base having oppositely directed lateral extensions as well as a pair of spaced walls extending respectively on opposite sides of said member beyond the other leg, an operating member pivotally supported by said walls and engaging the other leg for causing movement of said surfaces toward and away from each other, and means providing a notch adjacent the other end of said base engaging said one leg to restrain lateral movement between said base and said member.

5. A clamp comprising a U-shaped resilient member, jaw means providing gripping surfaces on the free ends of said legs respectively, fastening means securing at least one of said jaw means to the respective leg, a base extending along said one leg and adapted to cooperate with said fastening means whereby one end of the base is secured to said leg, said base having oppositely directed lateral extensions as well as a pair of spaced walls extending respectively on opposite sides of said member beyond the other leg, an operating member pivotally supported by said walls and engaging the other leg for causing movement of said surfaces toward and away from each other, and a pair of spaced lugs on said base for respectively engaging the opposite sides of said one leg.

6. A clamp comprising a U-shaped resilient member, jaw means providing gripping surfaces on the free end of said legs respectively, fastening means for securing at least one of said jaw means to the respective leg, said leg having a through aperture for accommodating said fastening means, a base extending along said one leg and having an aperture adjacent one end for receiving said fastening means, whereby said means secures the jaw means and the base to said leg, said base having oppositely directed lateral extensions as well as a pair of spaced walls extending on opposite sides of said member beyond said other leg, an operating member pivotally supported by said walls and engaging the other leg for causing movement of said surfaces toward and away from each other and means on said base adjacent the other end engaging the opposite sides of said leg.

GEORGE YATES.

No references cited.